United States Patent
Zhang et al.

(10) Patent No.: US 12,262,399 B2
(45) Date of Patent: Mar. 25, 2025

(54) LATENCY REDUCTION FOR BEAM FAILURE RECOVERY

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Huaning Niu, San Jose, CA (US); Jie Cui, San Jose, CA (US); Qiming Li, Beijing (CN); Sigen Ye, Whitehouse Station, NJ (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,068

(22) PCT Filed: Jul. 27, 2021

(86) PCT No.: PCT/CN2021/108653
§ 371 (c)(1),
(2) Date: Sep. 22, 2021

(87) PCT Pub. No.: WO2023/004581
PCT Pub. Date: Feb. 2, 2023

(65) Prior Publication Data
US 2024/0032083 A1    Jan. 25, 2024

(51) Int. Cl.
*H04W 72/54* (2023.01)
*H04L 5/00* (2006.01)

(52) U.S. Cl.
CPC ........... *H04W 72/54* (2023.01); *H04L 5/0053* (2013.01)

(58) Field of Classification Search
CPC ... H04W 72/54; H04W 72/541; H04W 24/08; H04L 5/0053; H04L 5/0048; H04B 7/0695; H04B 7/06952; H04B 7/06954; H04B 7/06956; H04B 7/06958; H04B 7/0696; H04B 7/06962; H04B 7/06964; H04B 7/06966; H04B 7/06968
See application file for complete search history.

(56) References Cited

U.S. PATENT DOCUMENTS

| 10,542,545 | B2 | 1/2020 | Yu et al. |
| 2011/0032935 | A1* | 2/2011 | Yang ........................ H04L 47/12 370/389 |
| 2019/0173740 | A1* | 6/2019 | Zhang ................. H04L 41/0677 |
| 2019/0372830 | A1* | 12/2019 | Zhang ................. H04L 41/0894 |

(Continued)

FOREIGN PATENT DOCUMENTS

| WO | 2020080915 | 4/2020 |
| WO | 2021027185 | 2/2021 |

OTHER PUBLICATIONS

International Search Report and Written Opinion issued in PCT Application No. PCT/CN2021/108653, dated Apr. 26, 2022 in 9 pages.

(Continued)

*Primary Examiner* — Stephen J Clawson
(74) *Attorney, Agent, or Firm* — Kilpatrick Townsend & Stockton LLP

(57) ABSTRACT

The present application relates to devices and components including apparatus, systems, and methods for latency reduction for beam failure recovery (BFR), with respect to transmit-receive point (TRP)-specific BFR.

20 Claims, 10 Drawing Sheets

(56) References Cited

U.S. PATENT DOCUMENTS

| | | | |
|---|---|---|---|
| 2020/0367208 A1 | 11/2020 | Khoshnevisan et al. | |
| 2021/0022167 A1 | 1/2021 | Khoshnevisan et al. | |
| 2021/0051710 A1* | 2/2021 | Cirik | H04L 5/0053 |
| 2021/0105166 A1 | 4/2021 | Khoshnevisan et al. | |
| 2021/0105759 A1* | 4/2021 | Bai | H04W 72/20 |
| 2021/0112619 A1 | 4/2021 | Bai et al. | |
| 2021/0143936 A1 | 5/2021 | Zhang et al. | |
| 2021/0377876 A1* | 12/2021 | Jeon | H04W 24/08 |
| 2022/0109547 A1* | 4/2022 | Svedman | H04B 7/0626 |
| 2022/0132517 A1* | 4/2022 | Zhu | H04L 5/0051 |
| 2023/0412337 A1* | 12/2023 | Liu | H04L 5/0048 |

OTHER PUBLICATIONS

Document entitled: "Summary on beam management for simultaneous multi-TRP transmission with multiple Rx panels" Source: Moderator (CATT), Agenda Item: 8.1.2.3, 3GPP TSG RAN WG1 Meeting #103-e, R1-200nnnn v001, e-Meeting, Oct. 26-Nov. 13, 2020, in 26 pages.

Document entitled: "Summary on beam management for simultaneous multi-TRP transmission with multiple Rx panels" Source: Moderator (CATT), Agenda Item: 8.1.2.3, 3GPP TSG RAN WG1 Meeting #103-e, R1-200nnnn v003, e-Meeting, Oct. 26- Nov. 13, 2020 in 27 pages.

Document entitled: "Beam Recovery In NR" Source: Nokia, Alcatel-Lucent Shanghai Bell, Wid/SID: Wi Code—Release 14, Agenda item: 9.3.1.1.2, 3GPP TSG RAN WG2 Meeting #96, R2-167713, Reno, USA, Nov. 14-18, 2016 in 4 pages.

Technical Specification entitled: "Requirements for support of radio resource management" (3GPP TS 38.133 version 16.7.0 Release 16); 5G; NR; ETSI TS 138 133 V16.7.0 (Jun. 2021); Reference RTS/TSGR-0438133vg70 in 2196 pages [cited for section 8.5].

Technical Specification entitled: "Physical layer procedures for control" (3GPP TS 38.213 version 16.5.0 Release 16); 5G; NR; ETSI TS 138 213 V16.5.0 (Apr. 2021); Reference RTS/TSGR-0138213vg50 in 188 pages [cited for section 6].

Technical Specification entitled: NR and NG-RAN Overall description; Stage-2; (3GPP TS 38.300 version 16.4.0 Release 16); 5G; NR; ETSI TS 138 300 V16.4.0 (Jan. 2021); Reference RTS/TSGR-0238300vg40 in 151 pages [cited for section 6.12].

Technical Specification entitled: "Medium Access Control (MAC) protocol specification" (3GPP TS 38.321 version 16.4.0 Release 16); 5G; NR; ETSI TS 138 321 V16.4.0 (Apr. 2021); Reference RTS/TSGR-0238321vg40 in 159 pages [cited for section 5.17].

Technical Specification entitled: "Radio Resource Control (RRC)"; Protocol specification; (3GPP TS 38.331 version 16.4.1 Release 16); 5G; NR; ETSI TS 138 331 V16.4.1 (Apr. 2021); Reference RTS/TSGR-0238331vg41 in 932 pages [cited for section 6.3.2].

\* cited by examiner

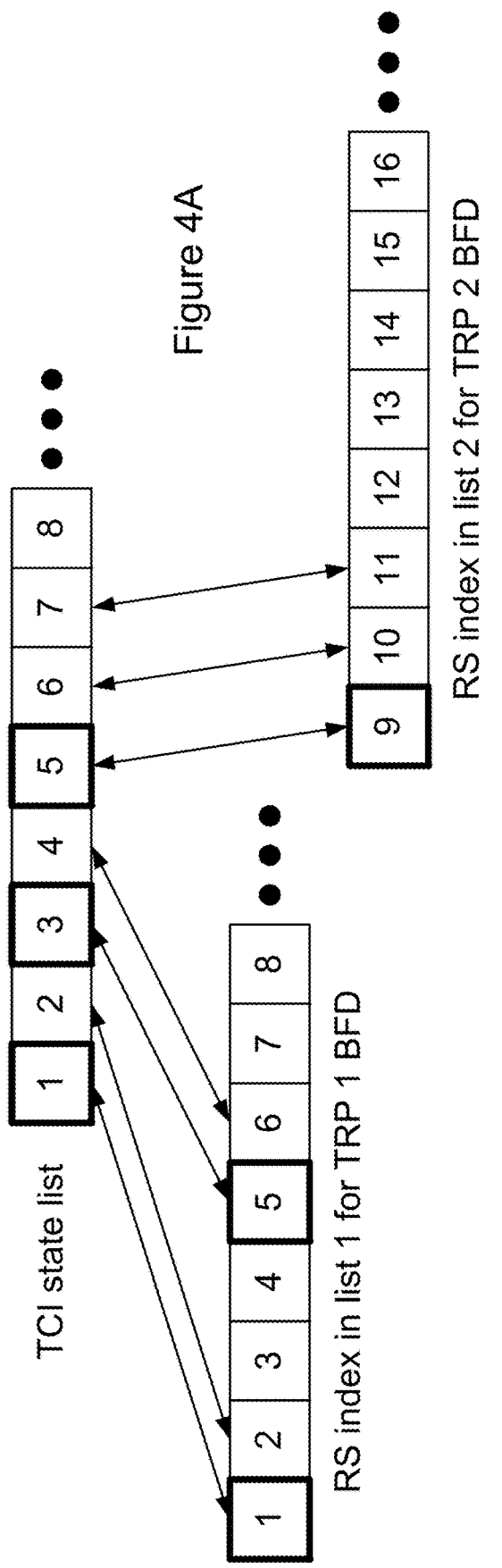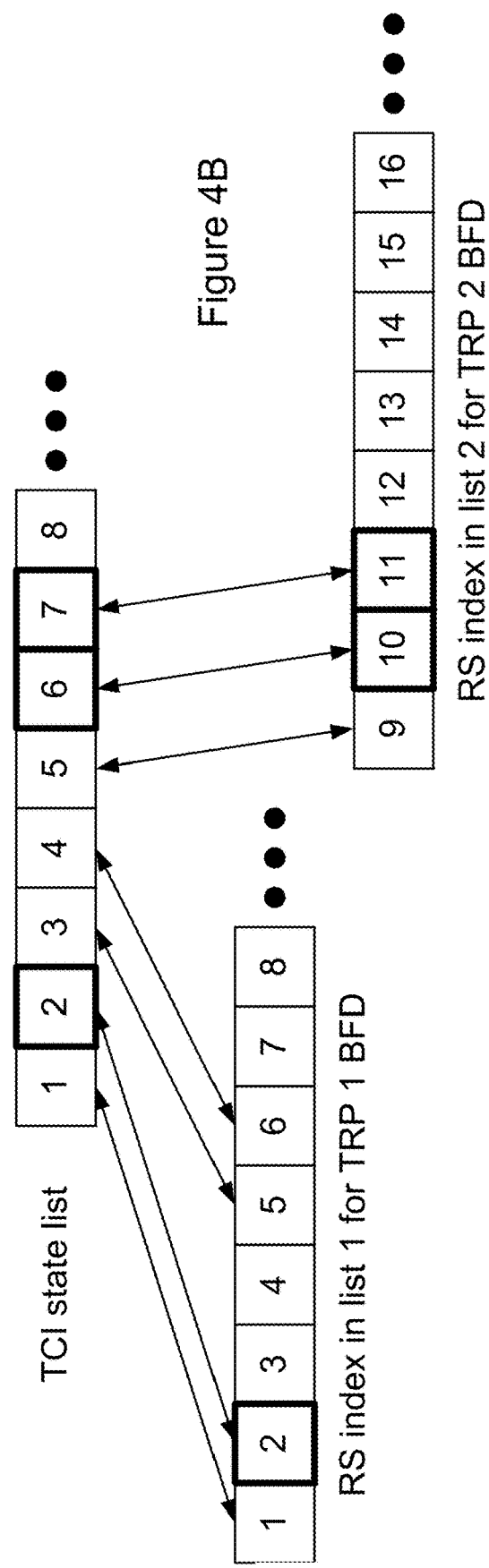

LATENCY REDUCTION FOR BEAM FAILURE RECOVERY

CROSS-REFERENCES TO RELATED APPLICATIONS

This application is a U.S. National Stage Application of PCT/CN2021/108653, filed Jul. 27, 2021, the disclosure of which is herein incorporated by reference in its entirety for all purposes.

BACKGROUND

Beam failure detection techniques and candidate beam detection techniques are described in existing Third Generation Partnership Project (3GPP) networks. Beam failure recovery techniques are also described in existing 3GPP networks. These techniques include detecting a beam failure, finding and selecting a new beam, and recovering a connection.

BRIEF DESCRIPTION OF THE DRAWINGS

FIG. 4A illustrates an example of TCI state activations and lists of candidate BFD RSs in accordance with some embodiments.

FIG. 4B illustrates an example of TCI state activations and lists of candidate BFD RSs in accordance with some embodiments.

DETAILED DESCRIPTION

Figure 1:
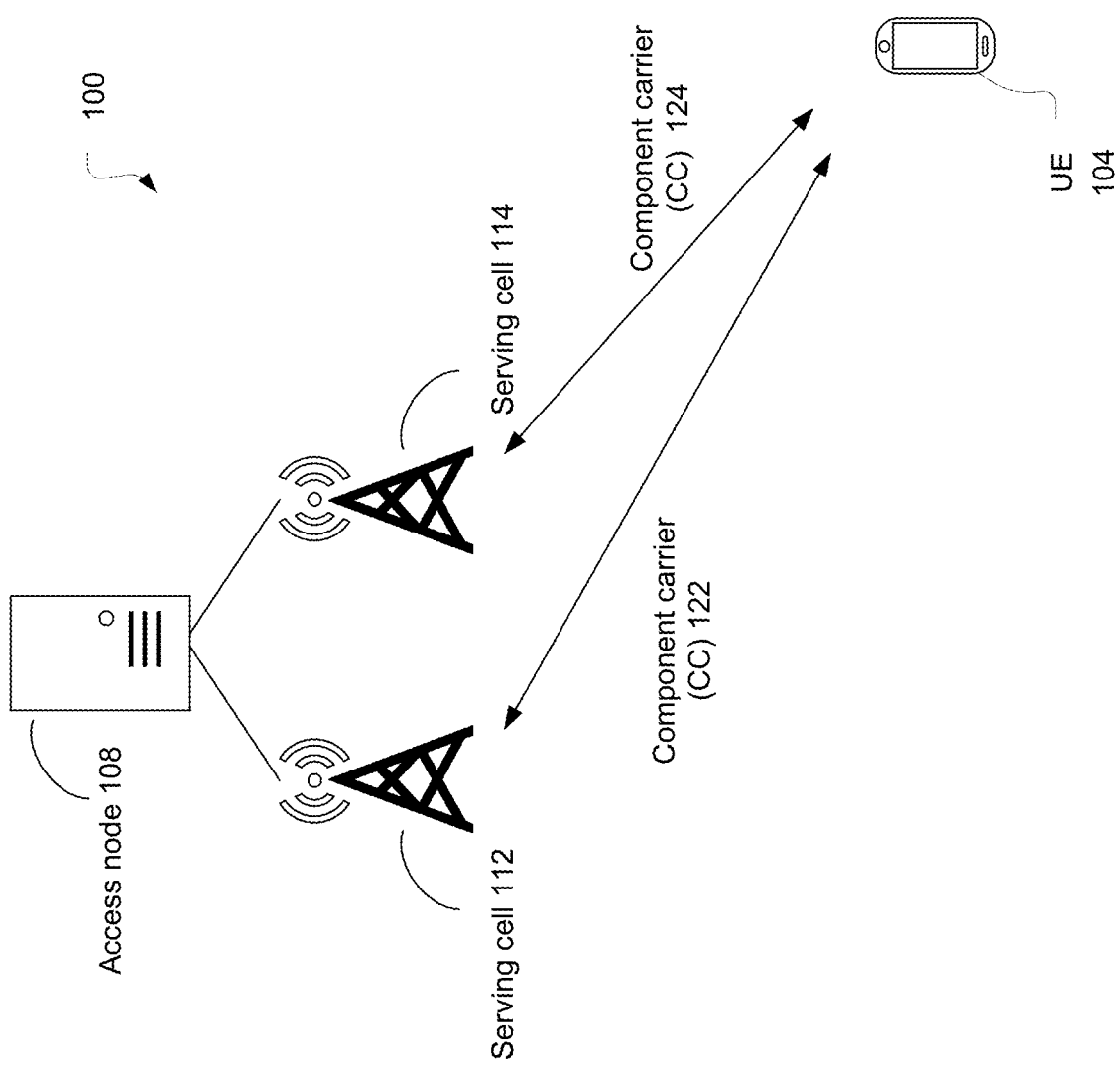
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point. The term "obtaining" is used to indicate any of its ordinary meanings, such as calculating, deriving, receiving (e.g., from another element or device), and/or retrieving (e.g., from memory/storage as described below).

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for latency reduction for beam failure recovery (BFR) are described herein, with respect to transmit-receive point (TRP)-specific BFR. FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio (NR) cells, through which the UE 104 may communicate with the access node 108 (e.g., over an NR-Uu interface). In some aspects, the access node 108 is a Next Generation NodeB (gNB) that provides one or more 3GPP NR cells.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UEs 102/104/106 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node (or "base station") 108, which may be a gNB, may use a PDCCH to transmit downlink control information (DCI) to the UE 104. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

The access node 108 may also transmit various reference signals to the UE 104. A Reference Signal (RS) is a special signal that exists only at PHY layer and is not for delivering any specific information (e.g., data), but whose purpose instead is to deliver a reference point for transmitted power. The RS s may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The RSs may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and physical downlink shared channel (PDSCH) transmissions. The UE 104 may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

The access node 108 may configure the UE 104 with transmission control indicator (TCI) state information to indicate quasi-co-location (QCL) relationships between antenna ports used for RSs (for example, SSB or CSI-RS) and downlink data or control signaling (for example, PDSCH or PDCCH). The access node 108 may use a combination of radio resource control (RRC) signaling, MAC control element (CE) signaling, and/or downlink control information (DCI) to inform the UE 104 of these QCL relationships.

Initially, the access node 108 may configure the UE 104 with a plurality of TCI states through RRC signaling. In some embodiments, up to 128 TCI states may be configured for PDSCH through, for example, a PDSCH-config information element (IE), and up to 64 TCI states may be configured for PDCCH through, for example, a PDCCH-config IE. Each TCI state may include a physical cell ID (PCI), a bandwidth part ID, an indication of the relevant SSB or CSI-RS, and an indication of the QCL type. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The TCI states may be set as inactive after initial configuration. The access node 108 may then transmit an activation command through, for example, a MAC control element. The activation command may activate up to eight combinations of one or two TCI states that correspond to eight codepoints of a TCI field in DCI. One or more specific TCI states may then be dynamically selected and signaled using the TCI field in DCI to indicate which of the active TCI states are applicable to a PDSCH resource allocation.

An access node 108 may transmit the PDCCH using resource elements that belong to a control resource set (CORESET). A search space configuration may refer to a particular CORESET to define a search space, for example, a specific set of resource blocks and symbols where the UE 104 is to attempt to decode the PDCCH. An access node 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and QCL information to support a successful reception of the PDCCH.

The QCL information in the ControlResourceSet information element may be provided by listing identities of TCI states. The TCI states identified in the ControlResourceSet information element may be a subset of the TCI states defined in the PDSCH-config that are in the active downlink bandwidth part to which the CORESET belongs. If the ControlResourceSet information element only provides a single TCI state, the UE 104 may assume a QCL relationship between the PDCCH and an RS specified by that TCI state. If a plurality of TCI states are listed, the UE 104 may rely on an activation command, such as that described above, to identify the TCI state to apply.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

The CC 122 may be in a band in Frequency Range 1 (FR1) or in Frequency Range 2 (FR2). Likewise the CC 124 may be in a band in FR1 or in FR2. The CCs 112 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Figure 2:
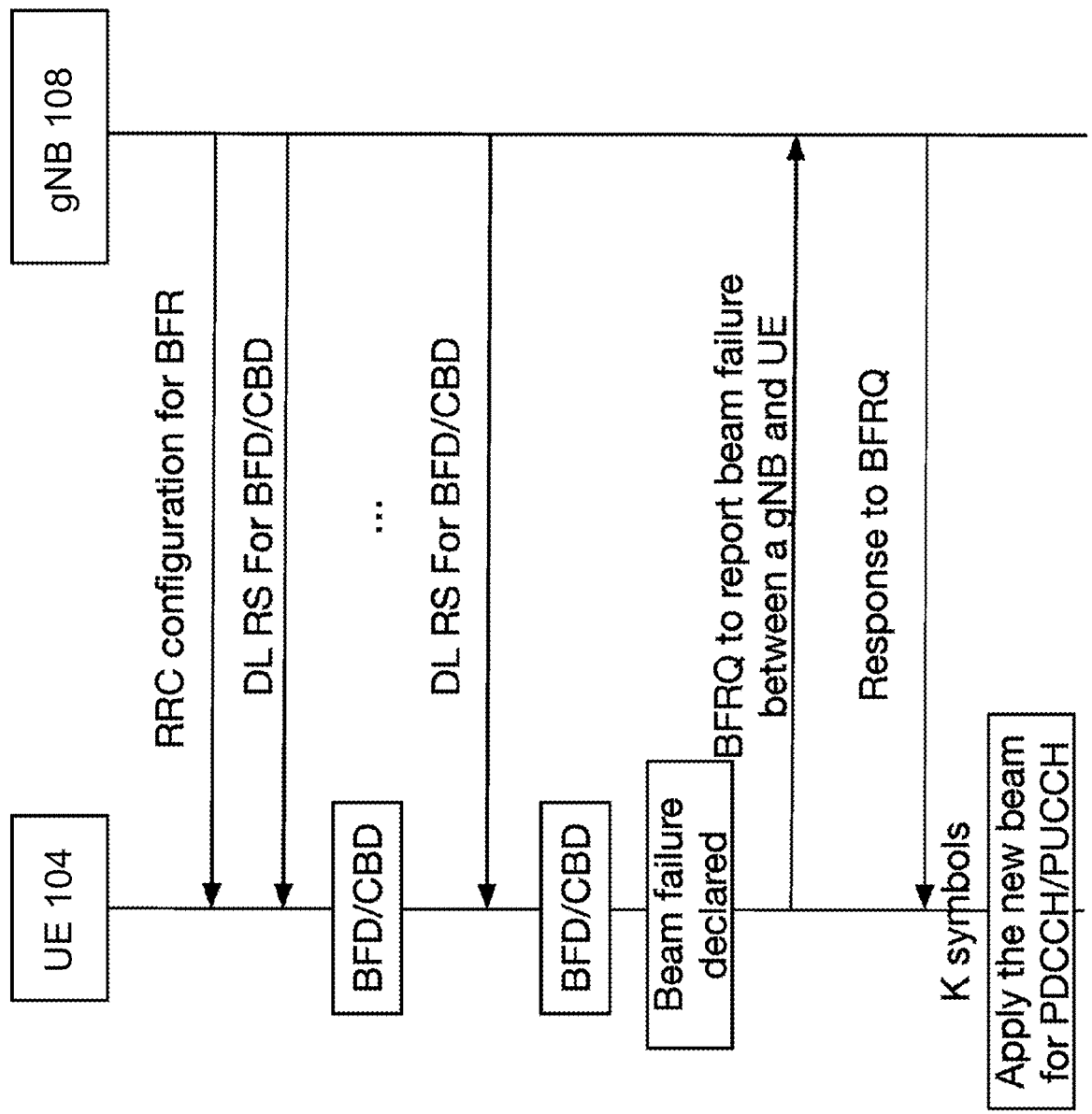
FIG. 2 shows an example of a UE-specific beam failure recovery (BFR) mechanism that may be supported in a 5G network in accordance with some embodiments.

FIG. 2 shows an example of a UE-specific beam failure recovery (BFR) mechanism that may be supported in a 5G network in accordance with some embodiments. A UE 104 can monitor the beam quality for the PDCCH to determine whether beam failure happens. The UE may monitor the beam quality based on an RS for beam failure detection (BFD) (e.g., the beam failure detection RS or "BFD RS") that is configured by the gNB 108. Monitoring the beam quality on the BFD-RS may include, for example, measuring a signal to interference and noise ratio (SINR), a block error rate (BLER), and/or a reference signal received power (RSRP) of the BFD RS. The gNB 108 may also configure some other RSs for candidate beam detection.

After the UE 104 declares beam failure, the UE 104 can report the candidate beam information based on a beam failure recovery request (BFRQ). For example, the UE may send, to the gNB, a MAC CE for BFR that includes the BFRQ. The gNB 108 can send a response (e.g., a beam failure recovery response or "BFRR") to the UE 104 after receiving the BFRQ. Subsequent to a predetermined delay period of K symbols after the UE 104 receives the gNB's response to the BFRQ (e.g., K=28), the UE 104 may apply the candidate beam to the PDCCH/PUCCH automatically. The UE 104 may update the power control parameters for PUCCH as well.

Two schemes may currently be used to configure beam failure detection (BFD) RSs. In a first scheme, BFD RSs are explicitly configured by RRC signaling. In a second scheme, BFD RSs are derived based on the RS configured in the TCI state for a CORESET. If two RSs are configured in the TCI state, the one providing QCL-TypeD indication is used.

In Release 17 of the 5G specification, it may be desired to support TRP specific BFR, such that the gNB may configure a UE to perform BFR for each TRP separately when the UE is configured with multi-TRP mode. It may be desired to support TRP-specific BFR for both single-DCI based and multi-DCI based multi-TRP modes. For multi-DCI mode, the Control Resource Sets (CORESETs) can be divided into two pools, and a CORESETPoolIndex can be configured in each CORESET. In this case, it may be assumed that CORESETs with the same CORESETPoolIndex are from the same TRP. For single-DCI mode, however, the UE has no information on TRP index for a CORESET.

If the first scheme described above (e.g., BFD RSs are explicitly configured by RRC signaling) is used for BFD RS configuration, then the gNB may use RRC signaling to reconfigure the BFD RS when it changes the beam for a CORESET by MAC CE or DCI, and the latency incurred by the BFD RS reconfiguration may be too large. If the second scheme described above (e.g., BFD RSs are derived based on the RS configured in the TCI state for a CORESET) is used for BFD RS configuration, because the UE has no information on the TRP for a CORESET, the UE may be unable to determine which TRP has failed. In addition, the UE may be unable to determine the CORESET(s) to which a newly identified beam(s) may be applied after a beam failure recovery.

Techniques as described below may be implemented to reduce the latency for beam failure recovery. Techniques for latency reduction for BFD RS update, for example, may be applied for TRP specific BFR in single-DCI based multi-TRP mode or in general BFR operation, while techniques for CORESET(s) beam update after beam failure recovery may be applied for TRP specific BFR in single-DCI based multi-TRP mode.

In a first example of BFD RS configuration, the gNB 108 may be implemented to provide K lists of candidate BFD RSs to UE 104 (e.g., by RRC signaling), where each of the K lists corresponds to a TRP. For example, K may be equal to one for a UE in single-TRP mode, and K may be equal to two for a UE in multi-TRP mode. The UE may receive an RRC message that contains the K lists. In one example, the UE receives an RRC message having an information element (IE) that contains the K lists (e.g., a BeamFailureRecoveryConfig IE). In another example, the UE receives an indication of a number of lists of candidate BFD RSs to be received (e.g., an indication of the value of K). In this case, the UE may receive an RRC message that contains a first of the K lists (e.g., an RRC message having an information element that contains the first list) from a first TRP, and the UE may receive an RRC message that contains a second of the K lists (e.g., an RRC message having an information element that contains the second list) from a second TRP.

In a first option, the K lists may be provided per bandwidth part (BWP). In a second option, the K lists may be provided per CC. In a third option, the K lists may be provided for a group of CCs (e.g., CCs that share the same list are grouped together). The CCs in a group may be predefined as CCs within a band or band group. Alternatively, the CCs in a group may be configured by RRC signaling.

For the third option as described above (e.g., the K lists are provided for a group of CCs), the lists may provide common reference signals for BFD for the group of CCs (e.g., for all of the CCs in the group). Alternatively, the lists may provide only common reference signal identifiers for BFD for the group of CCs (e.g., a list provides only a reference signal ID for each CC). In this case, for each CC, the corresponding reference signal with the indicated identifier can be used for BFD.

As an alternative to providing K lists of candidate BFD RSs to UE 104 as described above, the gNB 108 may be implemented to indicate an RS to be used for BFD that is associated with each TCI state. If no such RS is indicated, the RS configured in the TCI state can be used for BFD. The RS indication can be based on RRC or MAC CE signaling. In one such example, in each TCI state configured by RRC signaling, the gNB 108 may optionally indicate a BFD RS. In another such example, in a MAC CE used for TCI activation, the gNB 108 may optionally indicate a BFD RS for each TCI state being activated.

A UE 104 may be implemented to use the RSs within a list as described above to perform BFD. It may be desired for the RSs selected for BFD to be quasi-co-located (QCLed) with or the same as the RS configured in the TCI state for a CORESET. The UE may thus use the QCL relationship between the two reference signals to identify the BFD RS, so that when the UE updates the TCI state, the UE may also identify a potential BFD RS.

It may be desired for the RSs in the lists to be configured with different QCL properties. Alternatively, if N RSs in the list are QCLed with the RS configured in the TCI state for a CORESET, where N is greater than one, it may be desired to apply one of the following options to select among the QCLed RS for BFD.

In a first option for selecting among the N QCLed RS for BFD, a priority rule may be defined to select one of the N RSs for BFD. The priority may be determined, for example, by the periodicity, and/or density, and/or bandwidth, and/or RS index. In one such example, an RS having a smaller periodicity can be considered to have a higher priority. Among RSs that otherwise have the same priority, the RS with the lowest index can be considered to have a highest priority.

In a second option for selecting among the N QCLed RSs for BFD, the gNB 108 can indicate which RS to be used for BFD by MAC CE or DCI signaling. In one such example, in the beam indication signaling, the gNB can indicate the RS index of the RS among the N QCLed RSs that is to be used for BFD.

In a third option for selecting among the N QCLed RSs for BFD, the UE can use any or all of the N RSs for BFD, and such N RSs can be counted as one RS for BFD. For example, the UE may determine an average measurement of the N RSs. This average measurement may then be used for BFD.

Alternatively, the UE may use the RS configured in the TCI state for BFD, but the UE may use the index of the list of candidate BFD RSs that contains the configured RS (or the index of the list of candidate BFD RSs that contains an RS that is QCLed with the configured RS) to determine the corresponding TRP index.

Figure 3A:
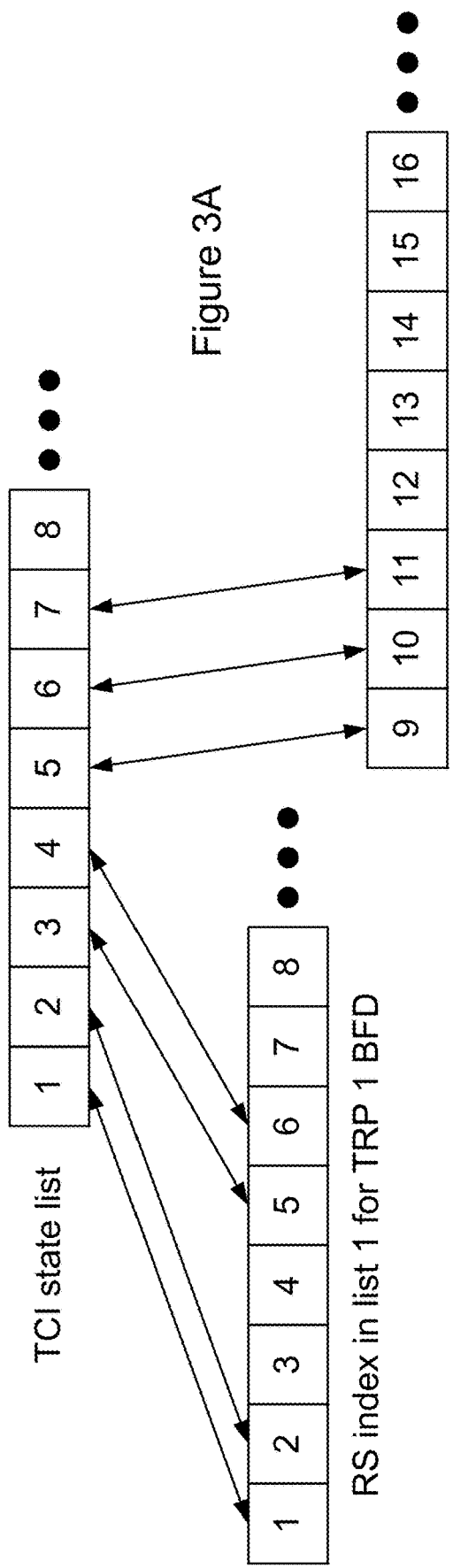
FIG. 3A illustrates an example of lists of TCI states and candidate BFD RSs in accordance with some embodiments.

FIG. 3A illustrates an example of lists of candidate BFD RSs as described above that may be provided by a gNB to a UE (e.g., using RRC signaling), a list of TCI states that may be activated for CORESETs, and associations among the RSs in the lists and the RSs configured in the TCI states as may be indicated by quasi-co-location (QCL) properties. In this example, the list 1 of BFD RSs for TRP 1 indicates that RS1 is QCLed with the RS configured in TCI state 1, RS2 is QCLed with the RS configured in TCI state 2, and RS5 is QCLed with the RS configured in TCI state 3; and the list 2 of BFD RSs for TRP 2 indicates that RS9 is QCLed with the RS configured in TCI state 5, RS10 is QCLed with the RS configured in TCI state 6, and RS11 is QCLed with the RS configured in TCI state 7.

Figure 3B:
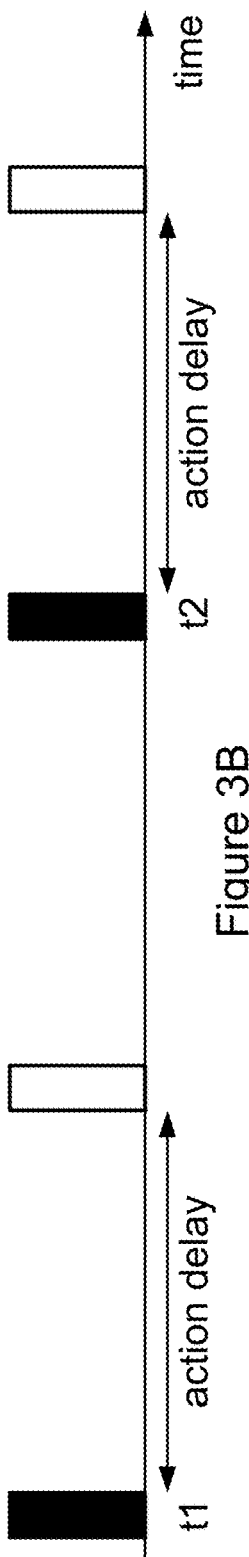
FIG. 3B shows an example of a timeline in accordance with some embodiments.

FIG. 3B shows an example of a timeline in which the UE 104 applies the associations shown in FIG. 3A in response to beam indication signaling from the gNB 108. At a first time t1, the UE receives beam indication signaling from the gNB 108 (e.g., by MAC CE and/or DCI signaling) to update the TCI states for CORESETs 1, 2, and 3 to TCI states 1, 3, and 5, respectively. For example, the gNB activates TCI state 1 for CORESET 1, the gNB activates TCI state 3 for CORESET 2, and the gNB activates TCI state 5 for CORESET 3. Based on the QCL relations between the RS configured in each activated TCI state and the RSs in the lists of BFD RSs for TRP 1 and TRP 2 (e.g., as highlighted in FIG. 4A), the UE determines that RSs 1 and 5 are to be used as BFD RSs for TRP 1 and that RS 9 is to be used as a BFD RS for TRP 2, and after an action delay, the UE 104 updates the BFD RS for TRP 1 to RSs 1 and 5 and updates the BFD RS for TRP 2 to RS 9.

At a second time t2, the UE receives beam indication signaling from the gNB 108 (e.g., by MAC CE and/or DCI signaling) to update the TCI states for CORESETs 1, 2, and 3 to TCI states 2, 6, and 7, respectively. For example, the gNB activates TCI state 2 for CORESET 1, the gNB activates TCI state 6 for CORESET 2, and the gNB activates TCI state 7 for CORESET 3. Based on the QCL relations between the RS configured in each activated TCI state and the RSs in the lists of BFD RSs for TRP 1 and TRP 2 (e.g., as highlighted in FIG. 4B), the UE determines that RS 2 is to be used as a BFD RS for TRP 1 and that RSs 10 and 11 are to be used as BFD RSs for TRP 2, and after an action delay, the UE 104 updates the BFD RS for TRP 1 to RS 2 and updates the BFD RS for TRP 2 to RSs 10 and 11.

As described above (e.g., with reference to FIG. 3B), after the UE receives the beam indication signaling to update the TCI state(s) for a CORESET(s), the UE may update the BFD RS for the corresponding TRP. The action delay for the BFD RS update after the UE receives the beam indication signaling to update the TCI state(s) for the CORESET(s) may be configured according to any of several options. In a first option, the action delay for the BFD RS update is the same as the beam indication action delay. For example, the UE may update the BFD RS for the TRP subsequent to a predetermined delay period (e.g., a predetermined number of milliseconds or slots) after the UE sends the last symbol of the acknowledgement (ACK) transmission that confirms receipt of the beam indication signaling.

In a second option for the action delay for the BFD RS update, the gNB may configure the action delay by higher layer signaling (e.g., by RRC or MAC CE signaling), or the UE may report the action delay as a UE capability (e.g., by capability signaling). In a third option, the action delay for the BFD RS update may depend on the beam failure indication interval. In this case, the UE may apply the new BFD RS at the next beam failure indication interval that occurs after the UE changes the beam. In one example, a UE may be configured to evaluate the beam failure detection about every two milliseconds, so that the delay between the UE changing the beam and updating the BFD RS may be expected to be within about two milliseconds.

A gNB may configure a number of BFD RSs for a TRP, and/or a number of BFD RSs across all TRPs, that exceeds a capability of the UE (which may be reported by the UE to the gNB by, e.g., capability signaling). If the number of BFD RSs configured for a TRP exceeds the UE capability of maximum number of BFD RS per TRP, the UE may proceed to down-select among the configured BFD RSs according to a priority rule for the BFD RS selection. The priority may be determined by any or all of a number of factors that may include, for example, search space periodicity, CORESET index, BFD RS periodicity, BFD RS density, BFD RS bandwidth, or BFD RS index.

In one example, the UE may determine the priority by selecting the BFD RS(s) associated with active TCI states for PDCCH receptions in CORESETs that correspond to the same list of candidate BFD RSs and are associated with the search space sets (e.g., in an order from the shortest monitoring periodicity). If two or more such CORESETs are associated with search space sets having the same monitoring periodicity, the UE may determine the order of the CORESET from the highest CORESET index (e.g., a CORESET index p as described in clause 10.1 of 3GPP Technical Specification (TS) 38.213 ("5G; NR; Physical layer procedures for control"), v16.5.0 (2021-04)). If the gNB configures a number of BFD RSs across TRPs that exceeds the UE capability of maximum number of BFD RS across TRPs, the UE may determine the priority additionally by TRP index (e.g., to prioritize BFD for one TRP, such as a primary TRP).

A UE may be configured to maintain a beam failure instance counter BFI_COUNTER to count how many times beam failure is detected. For example, the UE may be configured to declare beam failure only after it has detected multiple instances of beam failure (e.g., to avoid a ping pong effect). Since the BFD RS may be changed based on lower layer signaling (e.g. DCI-based beam indication signaling) as described above, it may be desired to reset the beam failure instance counter if the BFD RS is changed. For example, it may be desired to update section 5.17 of 3GPP TS 38.321 ("5G; NR; Medium Access Control (MAC) protocol specification," v16.4.0 (2021-04)) as indicated below:

1> if beamFailureDetectionTimer, beamFailureInstanceMaxCount, or any of the reference signals used for beam failure detection is reconfigured by upper layers or updated by lower layers associated with this Serving Cell:
2> set BFI_COUNTER to 0.

Subsequent to a predetermined number of symbols (e.g., 28 symbols) after the UE receives the response to the BFRQ (e.g., the BFRR) from the gNB, the UE may reset the beam, based on the newly identified beam reported by the UE in the BFRQ, for the CORESETs that share the same BFD RS list as reported in the BFRQ. The UE may determine the CORESETs that share the same BFD RS list based on the CORESET beam indication in the slot with the latest BFRQ (e.g., as included in a MAC CE for BFR). It may be desired for the PUCCH scheduled by the corresponding CORESET to be transmitted based on the newly identified beam. It may be desired to apply one or more default power control parameters (e.g., P0, closed-loop index) for the corresponding TRP. It may be desired for the pathloss reference signal to be based on the new beam index as reported by the UE in the MAC CE for BFR.

Figure 5:
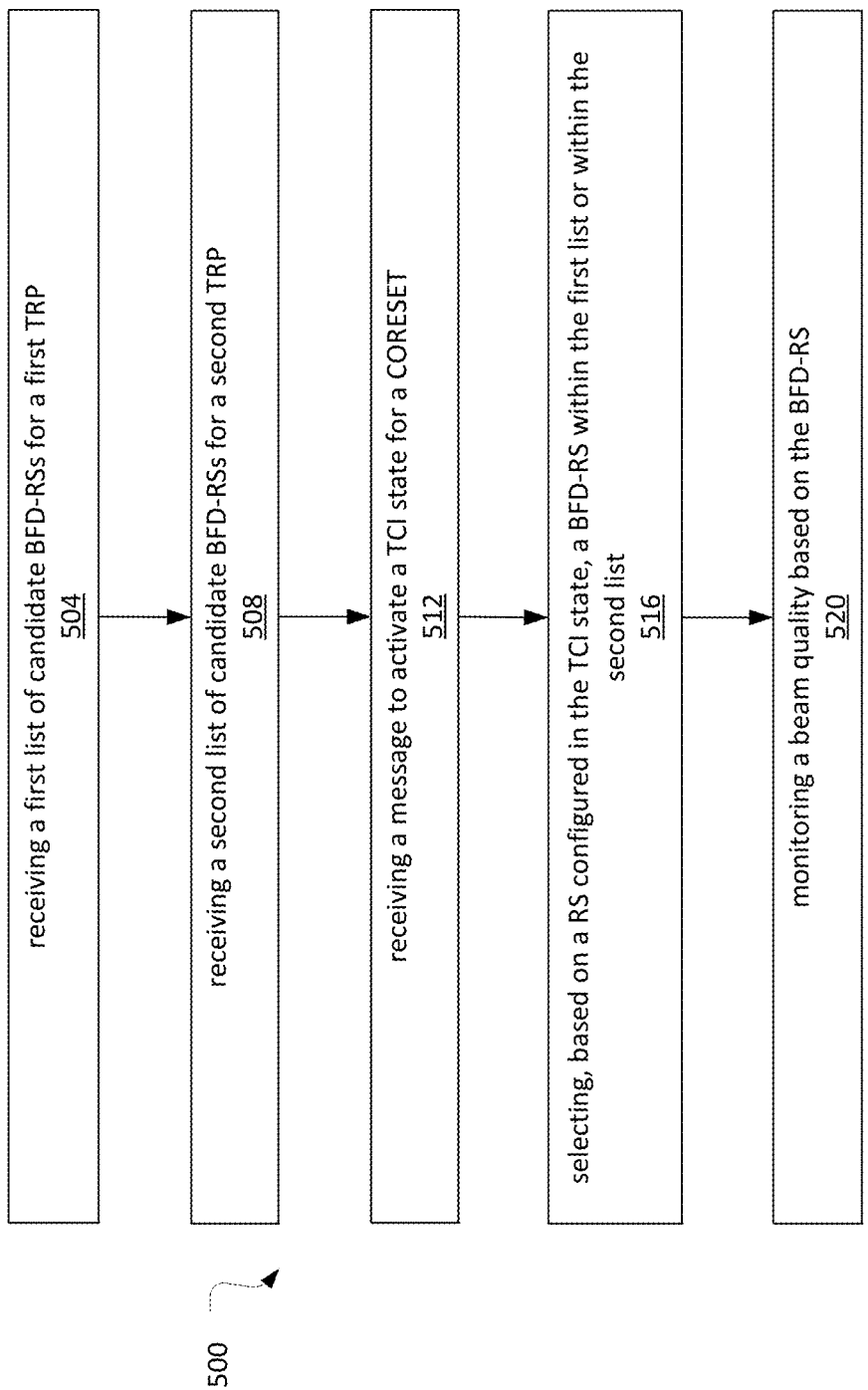
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a UE such as, for example, UE 104 or UE 900; or components thereof, for example, baseband processor 904A.

The operation flow/algorithmic structure 500 may include, at 504, receiving a first list of candidate BFD RSs for a first TRP. The first list may be for a first BWP, a first CC, a first group of CCs, etc. Structure 500 may also include receiving an indication of a number of lists of candidate BFD RSs to be received.

The operation flow/algorithmic structure 500 may include, at 508, receiving a second list of candidate BFD RSs for a second TRP. The second list may be for the first BWP, the first CC, the first group of CCs, etc. Structure 500 may also include receiving a third list of candidate BFD RSs for a second BWP, a second CC, a second group of CCs, etc. Additionally or alternatively, structure 500 may include receiving an RRC information element that comprises the first list and the second list.

The operation flow/algorithmic structure 500 may include, at 512, receiving a message to activate a TCI state for a CORESET. Structure 500 may include, based on receiving the message, resetting a beam failure detection counter.

The operation flow/algorithmic structure 500 may include, at 516, selecting, based on an RS configured in the TCI state, a BFD RS within the first list or within the second list. The selecting may be based on the BFD RS being quasi-co-located (QCLed) with the RS configured in the TCI state. Selecting the BFD RS from the plurality of BFD RS may be based on media access control (MAC) control element (CE) or downlink control information (DCI) signaling. Structure 500 may include identifying a plurality of BFD RSs that are QCLed with the RS configured in the TCI state, and the selecting may be based on a periodicity of the BFD RS or a density of the BFD RS. For example, the selecting may be based on the BFD RS having a smallest periodicity of the plurality of BFD RSs. Structure 500 may include determining the BFD RS has a priority equal to a first BFD RS of the plurality of BFD RSs, and the selecting may be based further on an index of the BFD RS. The BFD RS may be a first BFD RS, and structure 500 may include selecting a second BFD RS from the plurality of BFD RSs, and monitoring a beam quality on the first BFD RS and a beam quality on the second BFD RS.

The operation flow/algorithmic structure 500 may include, at 520, monitoring a beam quality based on the BFD RS. Structure 500 may include generating a BFRQ that is to indicate the BFD RS (e.g., in a MAC CE), receiving a beam failure request response (BFRR), and subsequent to a predetermined delay period after receiving the BFRR, resetting a beam for the CORESET based on a beam identified in the BFRQ. Structure 500 may further include transmitting, on the beam identified in the BFRQ, a physical uplink control channel transmission scheduled by the CORESET.

Figure 6:
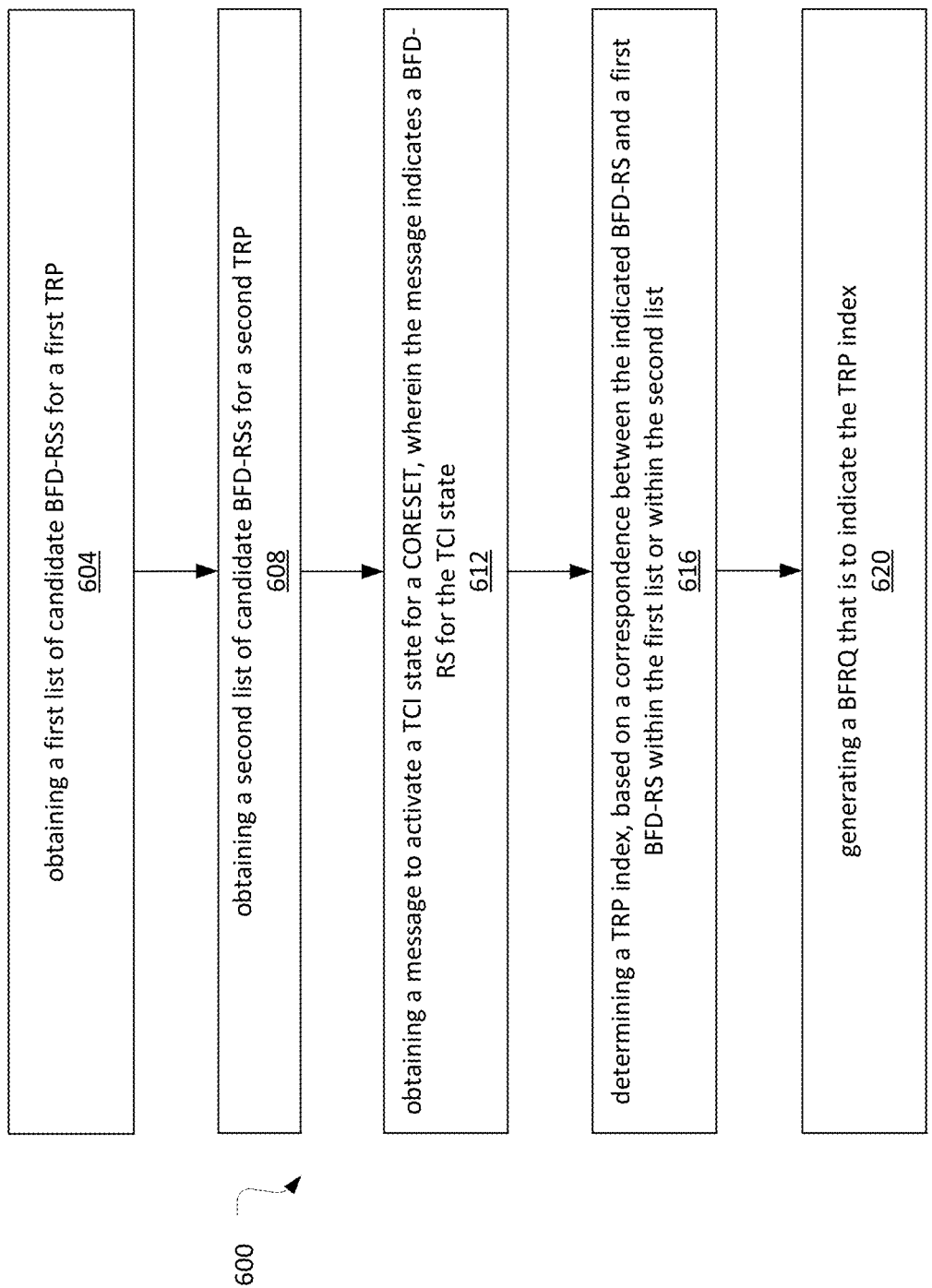
FIG. 6 illustrates an operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 900; or components thereof, for example, baseband processor 904A.

The operation flow/algorithmic structure 600 may include, at 604, obtaining a first list of candidate BFD RSs for a first TRP. The first list may be for a first BWP, a first CC, a first group of CCs, etc.

The operation flow/algorithmic structure 600 may include, at 608, obtaining a second list of candidate BFD RSs for a second TRP. The second list may be for the first BWP, the first CC, the first group of CCs, etc. Structure 600 may also include receiving a third list of candidate BFD RSs for a second BWP, a second CC, a second group of CCs, etc.

The operation flow/algorithmic structure 600 may include, at 612, obtaining a message to activate a TCI state for a CORESET, wherein the message indicates a BFD RS for the TCI state. Structure 600 may include, based on the message, resetting a beam failure detection counter.

The operation flow/algorithmic structure 600 may include, at 616, determining a TRP index, based on a correspondence between the BFD RS and a first BFD RS within the first list or within the second list. The correspondence may be that the BFD RS is the same as the first BFD RS. The correspondence may be that the BFD RS is quasi-co-located with the first BFD RS.

The operation flow/algorithmic structure 600 may include, at 620, generating a BFRQ that is to indicate the TRP index (e.g., in a MAC CE). Structure 600 may include generating an acknowledgement (ACK) that the message was received, and subsequent to a predetermined delay period after a last symbol of the ACK is sent, applying the BFD RS.

Structure 600 may include down-selecting among the candidate BFD RSs of the first list (and/or among the candidate BFD RS s of the second list) according to a priority rule, wherein the priority rule is based on search space periodicity, CORESET index, BFD RS periodicity, BFD RS density, BFD RS bandwidth, or BFD RS index. The priority rule may be based on a monitoring periodicity of search space sets associated with CORESETs that correspond to candidate BFD RSs among the first list. Additionally or alternatively, the priority rule may be based on TRP index.

Figure 7:
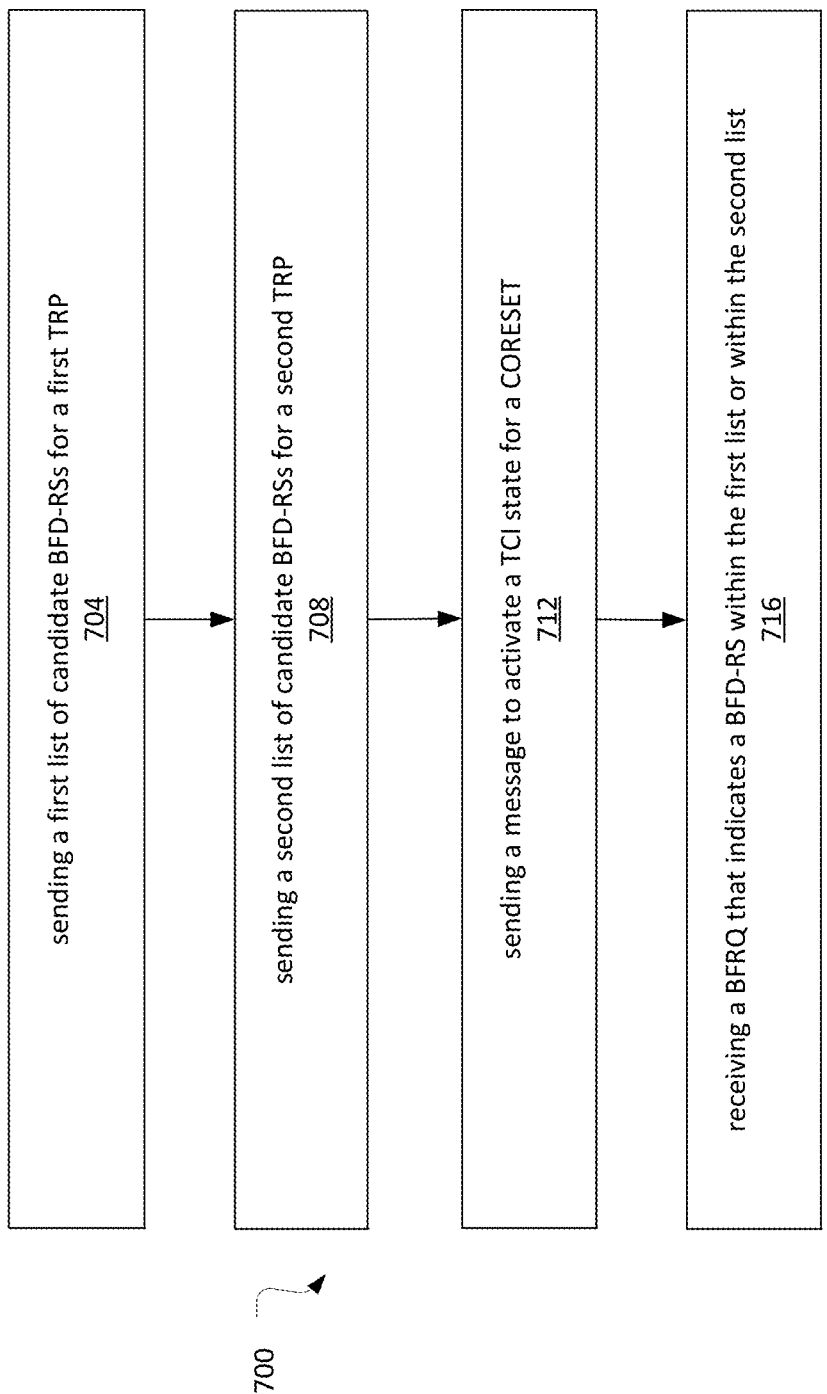
FIG. 7 illustrates an operational flow/algorithmic structure in accordance with some embodiments.

FIG. 7 illustrates an operation flow/algorithmic structure 700 in accordance with some embodiments. The operation flow/algorithmic structure 700 may be performed or implemented by a base station such as, for example, base station 108 or 1000; or components thereof, for example, baseband processor 1004A.

The operation flow/algorithmic structure 700 may include, at 704, sending a first list of candidate BFD RSs for a first TRP. The first list may be for a first BWP, a first CC, a first group of CCs, etc.

The operation flow/algorithmic structure 700 may include, at 708, send a second list of candidate BFD RSs for a second TRP. The second list may be for the first BWP, the first CC, the first group of CCs, etc. Structure 700 may also include sending a third list of candidate BFD RSs for a second BWP, a second CC, a second group of CCs, etc.

The operation flow/algorithmic structure 700 may include, at 712, send a message to activate a TCI state for a CORESET. The message may indicate a first BFD RS.

The operation flow/algorithmic structure 700 may include, at 716, receive (e.g., in a MAC CE) a BFRQ that indicates a BFD RS within the first list or within the second list. The BFD RS may be quasi-co-located with an RS configured in the TCI state. The BFRQ may indicate a TRP index that identifies the first TRP or the second TRP.

Figure 8:
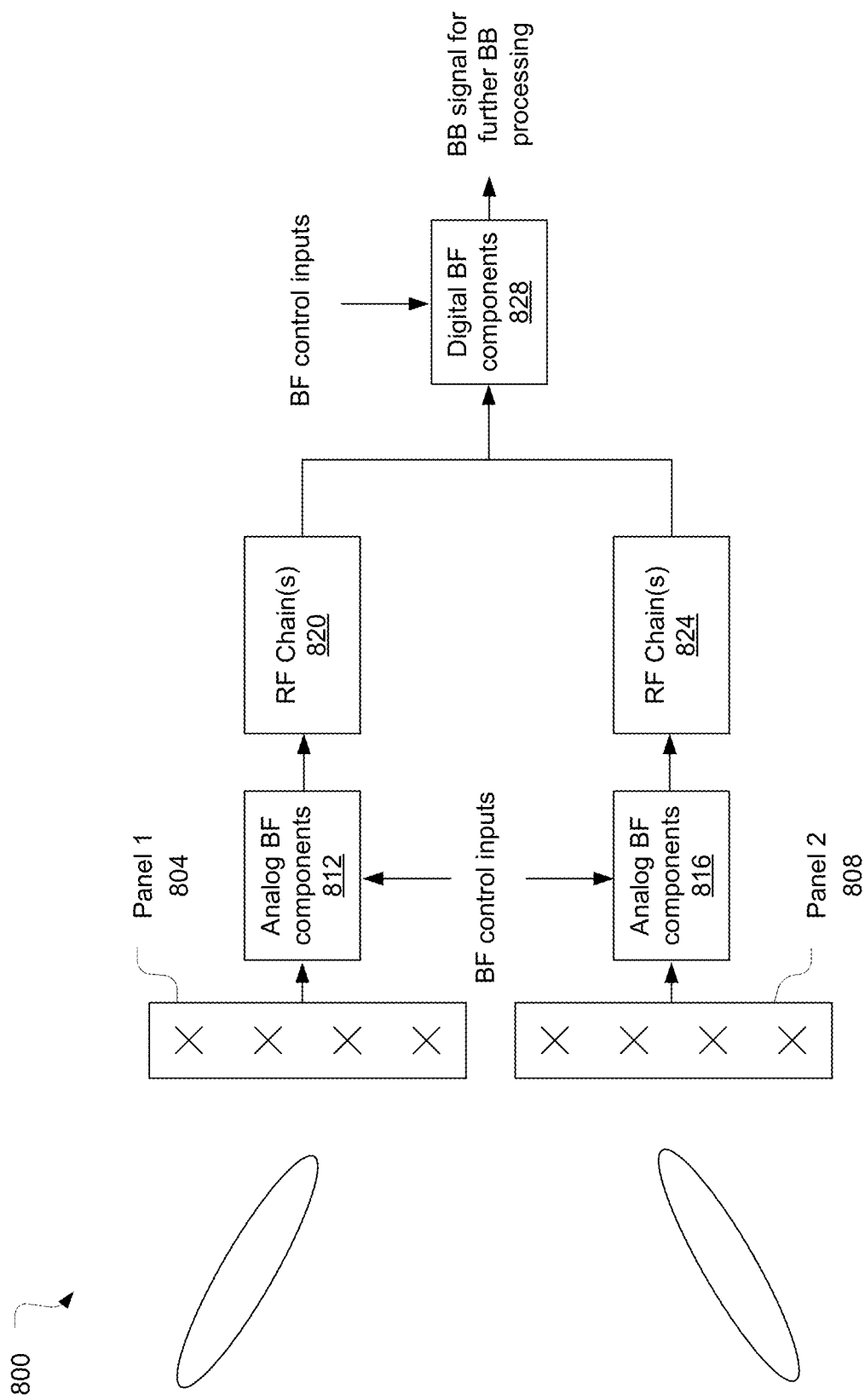
FIG. 8 illustrates beamforming components of a device in accordance with some embodiments.

FIG. 8 illustrates receive components 800 of a device in accordance with some embodiments. The device may be the UE 104 or serving cell 112 or 114. The receive components 800 may include a first antenna panel, panel 1 804, and a second antenna panel, panel 2 808. Each antenna panel may include a number of antenna elements.

The antenna panels may be coupled to respective analog beamforming (BF) components. For example, panel 1 804 may be coupled with analog BF components 812 and panel 2 808 may be coupled with analog BF components 816.

The analog BF components may be coupled with one or more radio-frequency (RF) chains. For example, analog BF components 812 may be coupled with one or more RF chains 820 and analog BF components 816 may be coupled with one or more RF chains 824. The RF chains may amplify a receive analog RF signal, downconvert the RF signal to baseband, and convert the analog baseband signal to a digital baseband signal, which may be provided to digital BF components 828. The digital BF components 828 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 812 or complex weights provided to the digital BF components 828. In some embodiments, the BF components and antenna panels may operate together to provide a dynamic phased-array that is capable of directing the beams in the desired direction.

In various embodiments, beamforming may include analog, only digital, or a hybrid analog-digital beamforming.

Digital beamforming may utilize separate RF chains that respectively correspond to the antenna elements.

While the beamforming components 800 describe receive beamforming, other embodiments may include beamforming components that perform transmit beamforming in analogous manners.

Figure 9:
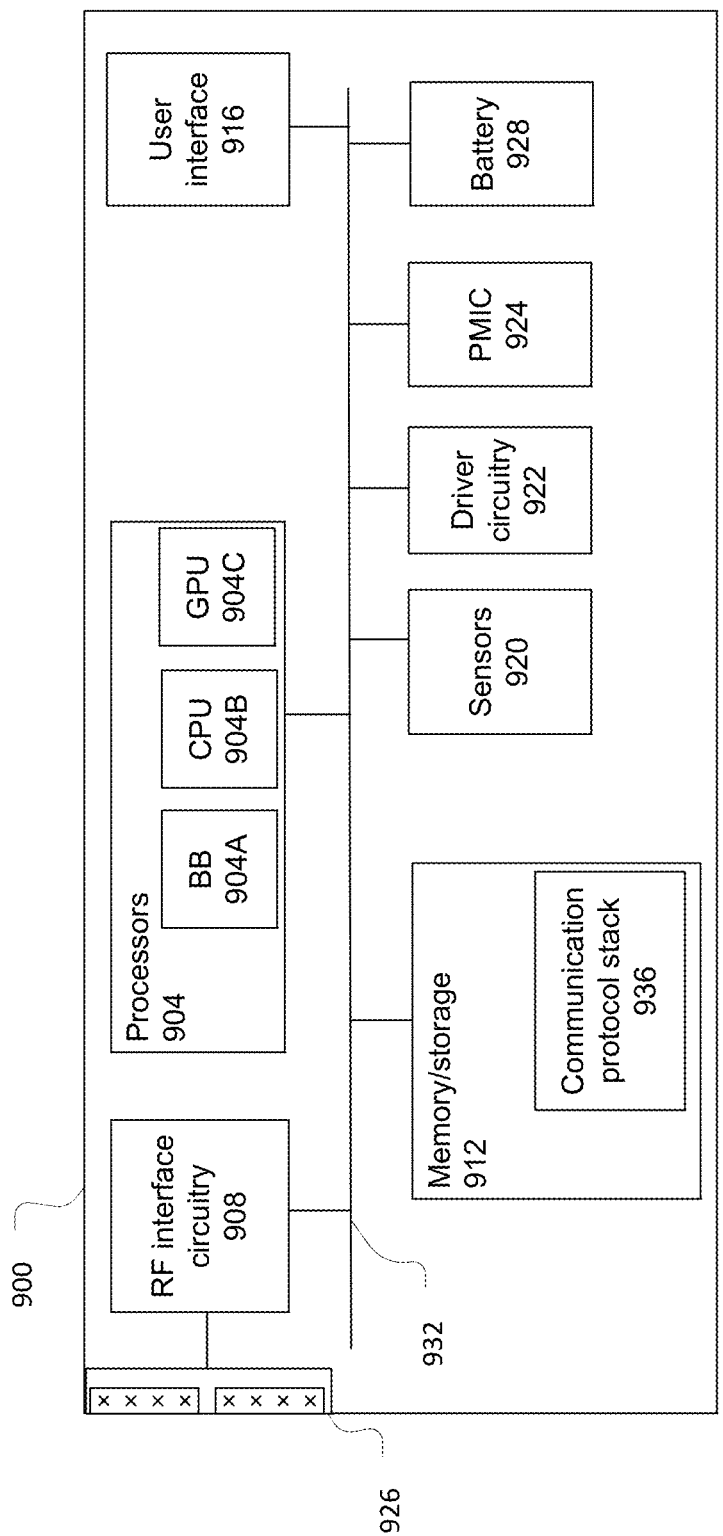
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
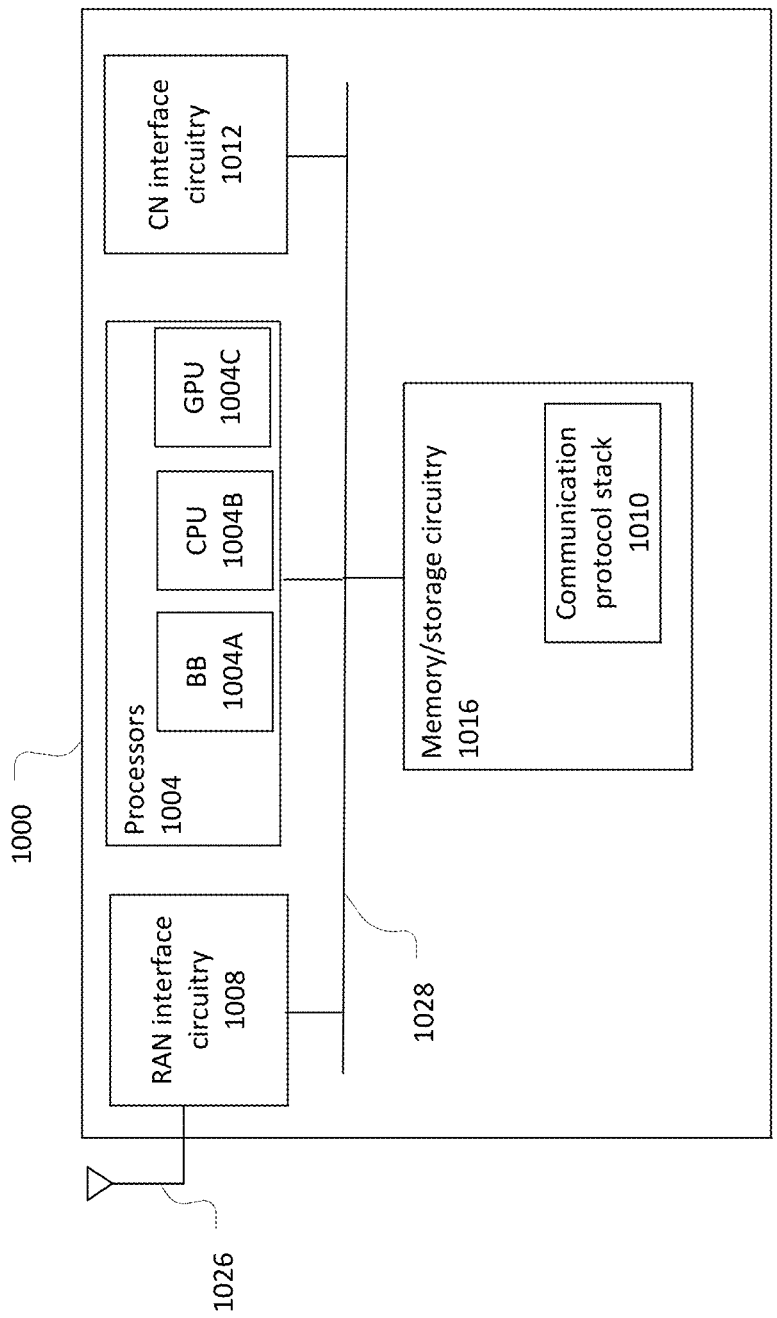
FIG. 10 illustrates a base station in accordance with some embodiments.

FIG. 10 illustrates an access node 1000 (e.g., a base station or gNB) in accordance with some embodiments. The access node 1000 may be similar to and substantially interchangeable with access node 108.

The access node 1000 may include processors 1004, RF interface circuitry 1008, core network (CN) interface circuitry 1012, memory/storage circuitry 1016, and antenna structure 1026.

The components of the access node 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising receiving a first list of candidate BFD RSs for a first TRP; receiving a second list of candidate BFD RSs for a second TRP; receiving a message to activate a TCI state for a CORESET; selecting, based on a RS configured in the TCI state, a BFD RS within the first list or within the second list; and generating a BFRQ that is to indicate the BFD RS. Example 1 may include receiving an indication of a number of lists of candidate BFD RSs to be received. Additionally or alternatively, Example 1 may include receiving an RRC information element (IE) that comprises the first list and the second list.

Example 2 includes the method of Example 1 or some other example herein, wherein the first list is for a first BWP, and the processing circuitry is further to receive a third list of candidate BFD RSs for a second BWP.

Example 3 includes the method of Example 1 or some other example herein, wherein the first list is for a first CC, and the processing circuitry is further to receive a third list of candidate BFD RSs for a second CC.

Example 4 includes the method of Example 1 or some other example herein, wherein the first list is for a first group of CCs, and the processing circuitry is further to receive a third list of candidate BFD RSs for a second group of CCs.

Example 5 includes the method of Example 1 or some other example herein, further comprising selecting the BFD RS based on the BFD RS being QCLed with the RS configured in the TCI state.

Example 6 includes the method of Example 5 or some other example herein, further comprising identifying a plurality of BFD RSs that are QCLed with the RS configured in the TCI state; and selecting the BFD RS from the plurality of BFD RSs based on a periodicity of the BFD-RS or a density of the BFD-RS.

Example 7 includes the method of Example 6 or some other example herein, further comprising selecting the BFD RS based on the BFD RS having a smallest periodicity of the plurality of BFD RSs; or determining the BFD RS has a priority equal to a first BFD RS of the plurality of BFD RSs, and selecting the BFD RS based further on an index of the BFD RS.

Example 8 includes the method of Example 5 or some other example herein, further comprising selecting the BFD RS from the plurality of BFD RS based on MAC CE or DCI signaling.

Example 9 includes the method of Example 5 or some other example herein, wherein the BFD RS is a first BFD RS and the method further comprises selecting a second BFD RS from the plurality of BFD RSs; and monitoring a beam quality on the first BFD RS and a beam quality on the second BFD RS.

Example 10 includes the method of Example 1 or some other example herein, wherein the method further comprises, based on receiving the message, resetting a beam failure detection counter.

Example 11 includes the method of Example 1 or some other example herein, wherein the method further comprises generating a BFRQ that is to indicate the BFD RS; receiving a BFRR; and subsequent to a predetermined delay period after receiving the BFRR, resetting a beam for the CORESET based on a beam identified in the BFRQ.

Example 12 includes the method of Example 11 or some other example herein, wherein the method further comprises transmitting, on the beam identified in the BFRQ, a physical uplink control channel transmission scheduled by the CORESET.

Example 13 includes an apparatus (e.g., a UE) comprising processing circuitry to obtain a first list of candidate BFD RSs for a first TRP; obtain a second list of candidate BFD RSs for a second TRP; obtain a message to activate a TCI state for a CORESET, wherein the message indicates a BFD RS for the TCI state; and determine a TRP index, based on a correspondence between the BFD RS and a first BFD RS within the first list or within the second list, and memory coupled to the processing circuitry, the memory to store the first list and the second list. The processing circuitry may also be to generate a BFRQ that is to indicate the TRP index.

Example 14 includes the user equipment of Example 13 or some other example herein, wherein the correspondence is that the BFD RS is the same as the first BFD RS, or the correspondence is that the BFD RS is quasi-co-located with the first BFD RS.

Example 15 includes the user equipment of Example 13 or some other example herein, wherein the processing circuitry is further to generate an ACK that the message was received; and subsequent to a predetermined delay period after a last symbol of the ACK is sent, apply the BFD RS.

Example 16 includes the user equipment of Example 13 or some other example herein, wherein the processing circuitry is further to reset a beam failure detection counter based on the message.

Example 17 includes the user equipment of Example 13 or some other example herein, wherein the processing circuitry is further to down-select among the candidate BFD RSs of the first list according to a priority rule, wherein the priority rule is based on search space periodicity, CORESET index, BFD RS periodicity, BFD RS density, BFD RS bandwidth, or BFD RS index.

Example 18 includes the user equipment of Example 17 or some other example herein, wherein the priority rule is based on a monitoring periodicity of search space sets associated with CORESETs that correspond to candidate BFD RSs among the first list.

Example 19 includes the user equipment of Example 17 or some other example herein, wherein the priority rule is based on the TRP index.

Example 20 includes one or more computer-readable media comprising instructions that, when executed by one or more processors, cause a base station to send a first list of BFD RSs for a first TRP; send a second list of candidate BFD RSs for a second TRP; send a message to activate a TCI state for a CORESET; and receive a BFRQ that indicates a BFD RS within the first list or within the second list.

Example 21 includes the one or more computer-readable media of Example 20 or some other example herein, wherein the first list is for a first BWP, and the instructions, when executed by the one or more processors, further cause the base station to send a third list of candidate BFD RSs for a second BWP.

Example 22 includes the one or more computer-readable media of Example 20 or some other example herein, wherein the first list is for a first CC, and the instructions, when executed by the one or more processors, further cause the base station to send a third list of candidate BFD RSs for a second CC.

Example 23 includes the one or more computer-readable media of Example 20, or some other example herein wherein the BFD RS is quasi-co-located with an RS configured in the TCI state.

Example 24 includes the one or more computer-readable media of Example 20 or some other example herein, wherein the BFRQ indicates a TRP index that identifies the first TRP or the second TRP.

Example 25 includes the one or more computer-readable media of Example 20 or some other example herein, wherein the message indicates a first BFD RS.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    processing configuration information received from a network, the configuration information to configure: a first list of beam failure detection (BFD) reference signals (RSs) for a bandwidth part (BWP) of a serving cell, and a second list of BFD RSs for the BWP of the serving cell;
    processing a media access control (MAC) control element (CE) received from the network;
    selecting, based on the MAC CE, a BFD RS within the first list or within the second list;
    determining a radio link quality based on the BFD RS; and
    determining whether a beam failure is detected based on the radio link quality.

2. The method of claim 1, wherein the BWP is a first BWP, and wherein:
    the first list is for the first BWP, and the method further includes receiving a third list of BFD RSs for a second BWP; or
    the first list is for a first component carrier (CC), and the method further includes receiving a third list of BFD RSs for a second CC; or
    the first list is for a first group of CCs, and the method further includes receiving a third list of BFD RSs for a second group of CCs.

3. The method of claim 1, wherein the BFD RS is a first BFD RS, and the method further comprising:
    selecting a second BFD RS based on the second BFD RS being quasi-co-located (QCLed) with an RS configured in a transmission configuration indicator (TCI) state.

4. The method of claim 3, the method further comprising:
    identifying a plurality of BFD RSs that are QCLed with the RS configured in the TCI state; and
    selecting a third BFD RS from the plurality of BFD RSs based on a periodicity of the BFD_RS or a density of the BFD_RS.

5. The method of claim 4, the method further comprising:
    selecting a fourth BFD RS based on the fourth BFD RS having a smallest periodicity of the plurality of BFD RSs; or
    determining the fourth BFD RS has a priority equal to a fifth BFD RS of the plurality of BFD RSs, and selecting the BFD RS based further on an index of the BFD RS.

6. The method of claim 1, the method further comprising receiving an indication of a number of lists of BFD RSs to be received.

7. The method of claim 1, the method further comprising:
    generating a beam failure recovery request (BFRQ) that is to indicate the BFD RS;
    receiving a beam failure request response (BFRR); and
    subsequent to a predetermined delay period after receiving the BFRR, resetting a beam for a control resource set (CORESET) based on a beam identified in the BFRQ.

8. An apparatus comprising:
    processing circuitry to:
        process configuration information, received from a network, the configuration information to configure: a first list of beam failure detection (BFD) reference signals (RSs) for a bandwidth part (BWP) of a serving cell, and a second list of BFD RSs for the BWP of the serving cell,
        process a media access control (MAC) control element (CE) received from the network,
        select, based on the MAC CE, a BFD RS within the first list or within the second list,
        determine a radio link quality based on the BFD RS, and
        determine whether a beam failure is detected based on the radio link quality; and interface circuitry coupled with the processing circuitry to enable communication.

9. The apparatus of claim 8, wherein the processing circuitry is further to:
generate an acknowledgement (ACK) that the MAC CE was received; and
subsequent to a predetermined delay period after a last symbol of the ACK is sent, apply the BFD RS.

10. The apparatus of claim 8, wherein the processing circuitry is further to reset a beam failure detection counter based on the MAC CE.

11. The apparatus of claim 8, wherein the processing circuitry is further to select among the BFD RSs of the first list according to a priority rule, the priority rule is based on search space periodicity, CORESET index, BFD RS periodicity, BFD RS density, BFD RS bandwidth, or BFD RS index.

12. The apparatus of claim 11, wherein the priority rule is based on a monitoring periodicity of search space sets associated with control resource sets (CORESETs) that correspond to BFD RSs among the first list.

13. The apparatus of claim 11, wherein the priority rule is based on a TRP index.

14. The apparatus of claim 8, wherein the processing circuitry is further to:
generate a beam failure recovery request (BFRQ) that is to indicate a transmit receive point (TRP) index based on determining whether the beam failure is detected based on the radio link quality.

15. One or more non-transitory computer-readable media comprising instructions that, when executed, cause processing circuitry to:
cause a first list of beam failure detection (BFD) reference signals (RSs) to be transmitted to a user equipment (UE), the BFD RSs for a bandwidth part (BWP) of a serving cell;
cause a second list of BFD RSs to be transmitted to the UE for the BWP of the serving cell;
cause a media access control (MAC) control element (CE) to be transmitted to the UE for selecting a BFD RS from the first list or the second list; and
process a beam failure recovery request (BFRQ) from the UE, the BFRQ to indicate the BFD RS within the first list or within the second list.

16. The one or more non-transitory computer-readable media of claim 15, wherein:
the BWP is a first BWP, and wherein:
the first list is for the first BWP, and
the instructions that, when executed, further cause the processing circuitry to send a third list of BFD RSs for a second BWP.

17. The one or more non-transitory computer-readable media of claim 15, wherein:
the first list is for a first component carrier (CC), and
the instructions that, when executed, further cause the processing circuitry to send a third list of BFD RSs for a second CC.

18. The one or more non-transitory computer-readable media of claim 15, the BFD RS is quasi-co-located with an RS configured in a TCI state.

19. The one or more non-transitory computer-readable media of claim 15, the BFRQ indicates a TRP index that identifies a first TRP or a second TRP.

20. The one or more non-transitory computer-readable media of claim 15, the MAC CE indicates a first BFD RS.

* * * * *